Figure 1:
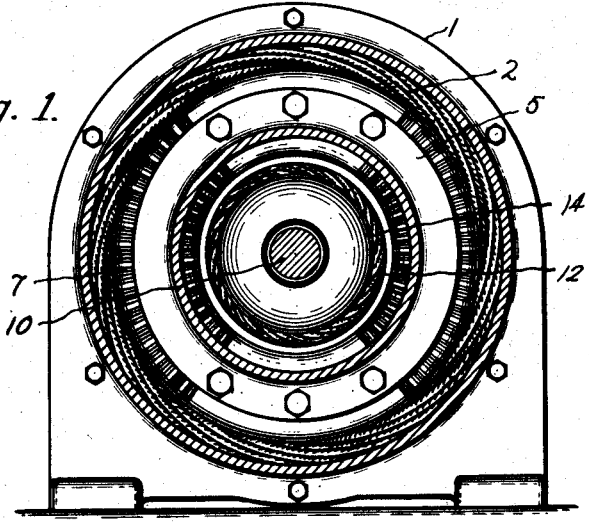

April 22, 1924.

E. THOMSON

HIGH SPEED ALTERNATING CURRENT DYNAMO ELECTRIC MACHINE

Filed Dec. 5, 1921   2 Sheets-Sheet 1

1,491,441

Inventor,
Elihu Thomson,
by Albert G. Davis
His Attorney.

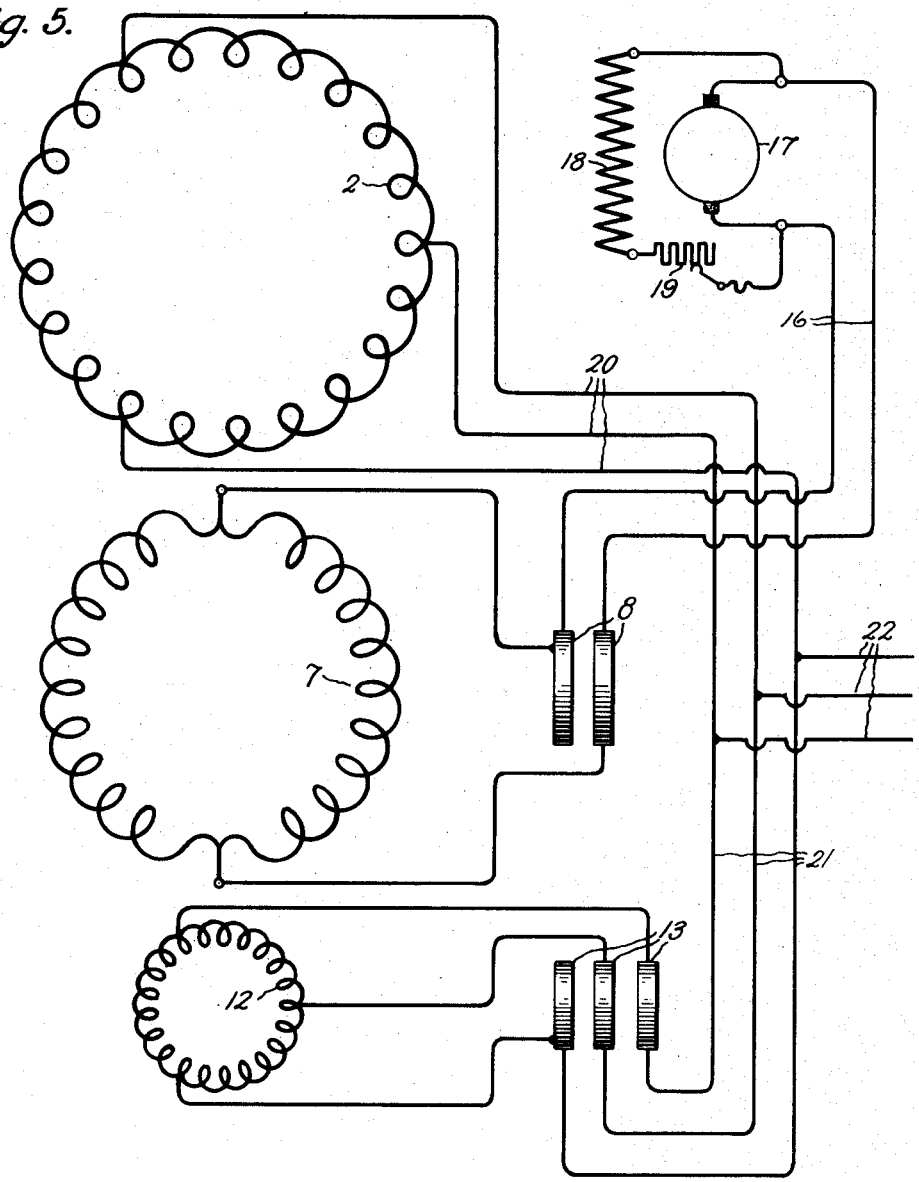

Patented Apr. 22, 1924.

1,491,441

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

HIGH-SPEED ALTERNATING-CURRENT DYNAMO-ELECTRIC MACHINE.

Application filed December 5, 1921. Serial No. 519,931.

*To all whom it may concern:*

Be it known that I, ELIHU THOMSON, a citizen of the United States, residing at Swampscott, in the county of Essex, State of Massachusetts, have invented certain new and useful Improvements in High-Speed Alternating-Current Dynamo-Electric Machines, of which the following is a specification.

My invention relates to alternating current dynamo electric machines; and has for its principal object to provide an alternating current dynamo electric machine capable of being used at higher speed than has heretofore been possible with commercial frequencies. Other advantages of my invention will be hereinafter pointed out.

In the operation of alternating current dynamo electric machines the frequency used will naturally govern the highest speed which may be used in their operation. If, for example, the induced winding or armature conductors are in relative motion to a bipolar field and the frequency is a standard 60 cycle frequency, the highest relative motion which can be used is 3600 revolutions per minute of either the field or the armature winding, while the other is stationary, and if the two structures move, one must move in an opposite direction to the other, which would reduce the speed of each below 3600 revolutions per minute. This is true whether the machine be a generator or a motor, and in case the apparatus is of the induction type, the motor speed will be less than 3600 revolutions per minute. In case the frequency is 25 cycles, the highest rotating speed heretofore possible was 1500 revolutions per minute. In some cases these and similar limitations are undesirable. It is well known, for example, that a simpler high efficiency turbine structure is obtained by raising the speed. The efficiency can be improved, the output per unit of weight increased, and the structure can be more simple when the prime mover is a turbine moving at a higher rate of revolutions than 3600 for example, to which, under ordinary circumstances it is held down on account of the frequency being set, in the given illustration, at 60 cycles. Similarly, in the driving of rotating apparatus, such for example, as centrifugal air compressors, speeds above 3600 revolutions per minute are well within the mechanical possibilities and the pressure developed per stage increases as the square of the speed for any given structure. This means that for any pressure desired, raising the speed may be of value in simplifying the number of stages required and in reducing the size of the whole structure, including the revolving parts. Of course, it is usually possible to run the turbine or other rotating apparatus at a higher speed than the electrical machine by using gearing or other speed changing devices therebetween; but it is generally desirable to avoid such devices because they add to the cost, take up valuable space and decrease the efficiency. My invention makes it possible to connect the electric machine directly to the rotating apparatus and operate at a speed which may be twice as high as has heretofore been possible with a given frequency.

Figure 2:
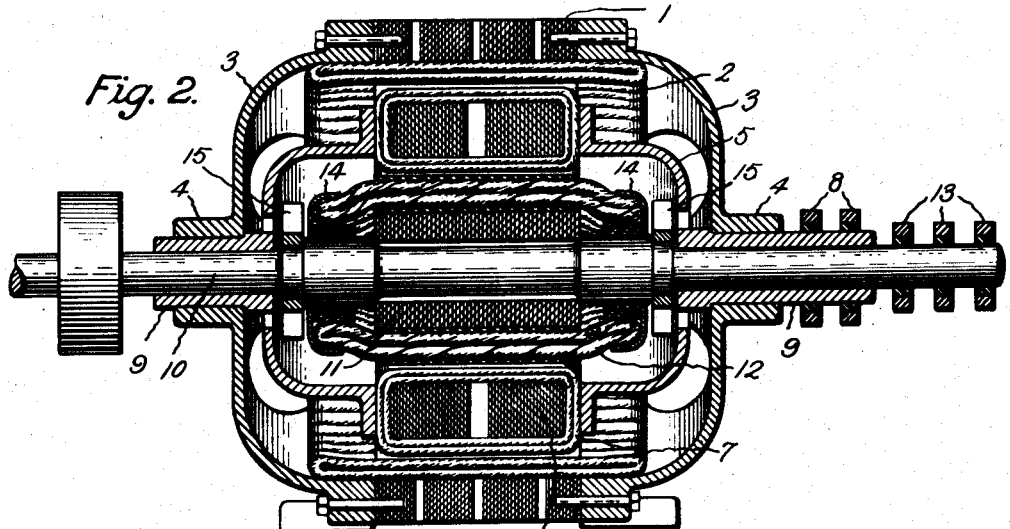
Figure 3:
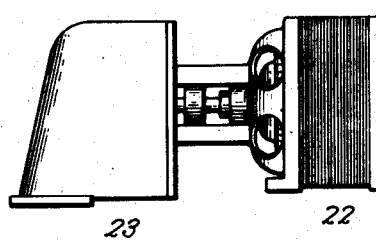
Figure 4:
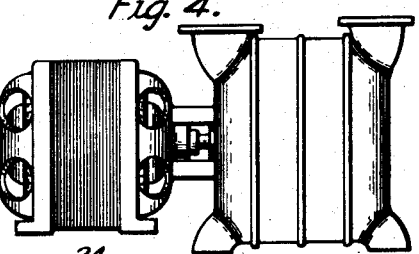

My invention will be better understood from the following description taken in connection with the drawings in which, Fig. 1 represents an end elevation of a machine embodying my invention; Fig. 2 a side elevation of the machine shown in Fig. 1; Fig. 3 a diagrammatic view of a generator embodying my invention driven by a steam turbine or other prime mover; Fig. 4 a diagrammatic view of my machine used as a motor for driving rotating apparatus; and Fig. 5 is a diagram of the electric circuits which may be used in one form of my machine, including the excitation circuit of the field magnet where the apparatus is of the synchronous type.

Referring now more in particular to Figs. 1 and 2 of the drawings, in which like numerals refer to like parts throughout, 1 indicates a stationary laminated core structure provided, in the present illustration, with a bipolar alternating current winding 2. This winding may be single or polyphase and may be wound on the stationary core structure in any of the well known ways used in winding alternating current machines and the stationary portion may be, in other respects, similar to the usual stationary element of this type of machine in which 3 indicates the end shields and 4 the bearing pedestals. Rotatively mounted in the bearing pedestals 4 on hollow shafts 9 is a framework 5 which carries a laminated central portion 6 upon which is wound an exciting winding 7 and which constitutes, in the present illustration, the revolving field magnet of the machine. This field magnet may be constructed in various ways, but as shown is wound as a bipolar magnet, that is, it is a ring of iron, having upon it a winding similar to that of the Gramme armature, but having connections for producing diametrically opposite north and south poles, as by entering current at the opposite ends of a diameter into the winding through which it passes in multiple. This however is not by any means a necessary limitation in the winding. Any arrangement of coils which will produce a magnetic field which may induce current in the external stationary winding and in the revolving internal structure, to be explained presently, may be used. The exciting winding 7 is connected in an appropriate manner to slip rings 8, mounted upon an extension of one of the hollow shafts 9, in order that the winding 7 may be excited in any well known manner. Extending through the hollow shafts 9 is a central shaft 10 adapted to be rotated therein, the hollow shafts 9 serving as bearings therefor. Secured to shaft 10 and centrally located within the revolving field structure 7 is an alternating current armature, comprising a laminated core 11 upon which is wound in any well known manner a bipolar alternating current winding 12 having the same number of phases as the stationary armature winding 2. The terminals of the winding 12 are connected to slip rings 13 through the shaft 10. The central armature is constructed to withstand high speed. To this end it is provided with suitable retaining shields 14 and the armature may be provided with other retaining bands not shown or the coils may be retained in suitable slots in the armature core by wedges in a well known manner. To provide for sufficient ventilation I prefer to use small fans 15 and provide apertures in the end shields 3 and in the end portions of the revolving framework 5 adjacent the shaft, through which air may be drawn by the fans and forced through the usual ventilating ducts provided in the laminated structures as illustrated.

Summarizing briefly the foregoing description, the machine consists of a stationary alternating current armature winding, a relatively rotating alternating current armature winding, the two windings having an equal number of phases, and a freely rotatable field separating the two armature windings and in close proximity thereto and capable of inducing therein a common magnetic field. It is now evident that if the two armature windings are connected in parallel so as to have mechanically opposite phase rotation with respect to each other, and the inner armature is rotated with the intermediate field excited, the field structure will rotate at half the speed of the rotating armature and there will be generated in the two armature windings voltages which correspond in phase and frequency with each other. For example, let us assume that the two armature windings are connected in parallel, that the inner armature is driven at 7200 revolutions per minute by a steam turbine direct connected thereto, and that the intermediate field structure is excited by a suitable source of direct current and allowed to rotate freely while the outside armature is stationary, then the poles developed in the bipolar revolving field magnet, working inwardly and outwardly, will at the same moment have a relative speed to the outside or stationary armature of 3600 revolutions per minute and a speed of 3600 revolutions per minute to the interior or rotating armature which is rotating a double speed or 7200 revolutions per minute and the electromotive forces generated in the two armature windings will be of 60 cycle frequency and may be connected in parallel to supply an external load. It is of course evident that the two armature windings should be so proportioned with respect to the field flux that the electromotive forces generated therein will be equal and that the respective armature leads should be connected together so as to give the same phase rotation with respect to the line. The alternating current generated will be divided between the stationary and rotating armatures and the latter, being the only one driven, thus becomes the means of generating a standard frequency alternating current while utilizing a higher speed than is possible with the ordinary dynamo structure.

The wiring diagram for these connections is illustrated in Fig. 5 where 2 represents a 3-phase bipolar winding for the stationary armature, 12 represents a 3-phase bipolar winding for the rotating armature and 7 represents a bipolar intermediate field winding. Field winding 7 is connected through slip rings 8 and the mains 16 to an exciter 17. The exciter is provided with a field winding 18 and a field rheostat 19 for adjusting the excitation supplied to the field winding 7. This exciter may be driven in any suitable manner from the shaft of the machine it excites. The armature winding 12 is connected through slip rings 13, and the armature winding 2 is connected through leads 20 to a common bus 21 from which power may be taken by the mains 22. It is evident, since the field winding 7 rotates in relatively opposite directions with respect to the armature windings 2 and 12, that the phase rotations of their corresponding armature leads, as shown in Fig. 5, will be opposed, whereupon it is necessary to connect them to bus 21 in a reverse direction as illustrated in Fig. 5. When such coupling is made in parallel, it is not necessary to drive the field structure 7, since all that it is necessary to do is to allow it freedom of motion so that it may revolve at that speed which it takes up automatically. A diagrammatic representation of such a generator is represented at 22 in Fig. 3 driven by a direct connected high speed steam turbine 23.

Although the invention has been described in connection with a synchronous generator, it is evident that it is equally applicable to a synchronous motor and I have diagrammatically represented in Fig. 4 such a motor 24 driving a high speed centrifugal apparatus 25 to which it is directly connected. In case the machine embodying my invention is used as a motor the wiring diagram shown in Fig. 5 may be used, the alternating current energy being fed into the two armatures in parallel and the rotating field being excited in the usual manner, whereupon the rotating field will take upon itself a speed intermediate that of the stationary and rotating armatures, which intermediate speed will be for a bipolar 60 cycle machine, 3600 revolutions per minute. The rotating field magnet will revolve freely without doing any work, requiring only sufficient power to keep it in synchronism. Any tendency to rotate at a different speed will be opposed by the rotating fields produced in the armature windings by the alternating current. The inner shaft which carries the rotating armature will be driven at 7200 revolutions per minute and consequently may be utilized for driving rotating apparatus at this high speed without the use of intermediate gearing or speed changing means. It is possible to supply substantially all of the excitation required for the intermediate field structure through the alternating current windings by leading currents supplied from the line 22, from other synchronous apparatus, not shown, whereby the direct current winding thereon may be of small capacity, and by making the intermediate structure of magnetic material having permanent magnetism of the proper polarity, or with definite poles, the direct current exciting winding may be omitted entirely and I intend in the appended claims to embrace such a field structure.

In the illustrations given above my invention has been described in connection with bipolar 60 cycle machines. It is evident however that the invention is equally applicable to other combinations of poles and frequencies. It is known that with the usual type of alternating current machinery using 60 cycle current, a bipolar machine operates at 3600 revolutions per minute and a 4-pole machine at 1800 revolutions per minute. In some instances it might be highly desirable to operate at some intermediate speed. With my invention a 6-pole, 60 cycle machine may be utilized for obtaining an operating speed of 2400 revolutions per minute, the intermediate field rotating at 1200 revolutions per minute.

It will be evident to those skilled in the art that my invention is not limited to synchronous electrical machinery but may be applied to asynchronous electrical machinery as well in which case the intermediate rotating field previously described would be replaced by a secondary winding such as is used in induction motors. This winding may be either of the wound or squirrel cage type, the secondary serving at the same time for both the stationary and rotating primary windings and such a machine could be used either as an induction motor or as an induction generator.

The relation between speed, frequency and number of poles of the ordinary type of alternating current dynamo electric machines is expressed by the equation $$s = \frac{60f}{P}$$

where $s$ represents the synchronous speed in revolutions per minute, $f$, the frequency in cycles per second and $P$ the number of pairs of poles. The relation of speed, frequency and number of poles of a machine built according to my invention may be expressed by the equations $$S = \frac{120f}{P}$$

and $$S' = \frac{60f}{P},$$

where $S$ represents the relative synchronous speed in revolutions per minute between the two armature structures, $S'$ the relative synchronous speed between the intermediate field structure and either of the armature structures, $f$ the frequency in cycles per second and $P$ the number of pairs of poles.

While I have described my invention in connection with a machine having the inner armature rotative, there may be cases where it would be advantageous to make the outer armature rotative and the inner armature stationary and still other cases where it might be advantageous to make the intermediate member stationary and have the outer and inner armature structures rotatably mounted whereby equal and opposite rotations from a single machine might be obtained without the use of gearing. Furthermore, instead of arranging the various elements of my machine concentrically as illustrated, I may mount them adjacent each other along the same axis with the common field or secondary element between the armature structures. These and other modifications will be evident to those skilled in the art and I therefore do not wish to be limited to any particular arrangement but seek to cover in the appended claims all modifications and arrangements which involve the fundamental principle of my invention.

What I claim as new and desire to secure by Letters Patent of the United States, is:—

1. A synchronous alternating current dynamo electric machine having two relatively rotatable armatures having windings connected in parallel with mechanically opposite phase rotations and a common field member for said armatures provided with a single exciting winding, said field member being rotatably mounted between said armature members.

2. A synchronous alternating current dynamo electric machine having a stationary armature and a rotatably mounted armature, said armatures being provided with windings connected in multiple with mechanically opposite phase rotations and a common direct current field member for said armatures rotatably mounted therebetween.

3. An alternating current dynamo electric machine having two relatively rotatable armatures connected in parallel so as to give the same phase rotation to an external line and a common secondary or field element, the secondary element for said armatures being provided with a single winding, said element being rotatably mounted between said armature members.

In witness whereof, I have hereunto set my hand this first day of December, 1921.

ELIHU THOMSON.